United States Patent

Furcsik et al.

[11] Patent Number: 5,164,215
[45] Date of Patent: Nov. 17, 1992

[54] BATTER STARCH FOR DEEP FAT FRIED FOOD

[76] Inventors: Susan L. Furcsik, 2500 County Line Rd., Lake Station, Ind. 46405; Edward D. DeBoer, 21911 Merrill Ave., Sauk Village, Ill. 60411

[21] Appl. No.: 627,557

[22] Filed: Dec. 10, 1990

Related U.S. Application Data

[63] Continuation of Ser. No. 392,840, Aug. 11, 1989, abandoned.

[51] Int. Cl.⁵ .................. A21D 10/04; C08B 31/02; C08B 30/00
[52] U.S. Cl. .................. 426/549; 127/32; 127/65; 127/71; 426/658; 426/661; 536/102; 536/107; 536/110
[58] Field of Search .............. 426/549, 658, 661; 127/32, 38, 39, 40, 65, 71; 536/102, 107, 110

[56] References Cited

U.S. PATENT DOCUMENTS

| | | | |
|---|---|---|---|
| 3,655,443 | 4/1972 | Campbell | 127/70 |
| 4,218,485 | 8/1980 | Lee et al. | 426/296 |
| 4,595,597 | 6/1986 | Lenchin et al. | 426/555 |
| 4,774,328 | 9/1988 | Friedman et al. | 536/102 |

Primary Examiner—Donald E. Czaja
Assistant Examiner—Evan Federman

[57] ABSTRACT

The batter starch is esterified to have a degree of substitution between 0.02 to 0.1, and a protein content greater than or equal to 1.0%. The starch is obtained from a starch bearing plant of the duh homozygous genotype. Maize is the preferred source for the starch and the preferred protein source is gluten. The preferred esterification agent is acetic anhydride.

20 Claims, 1 Drawing Sheet

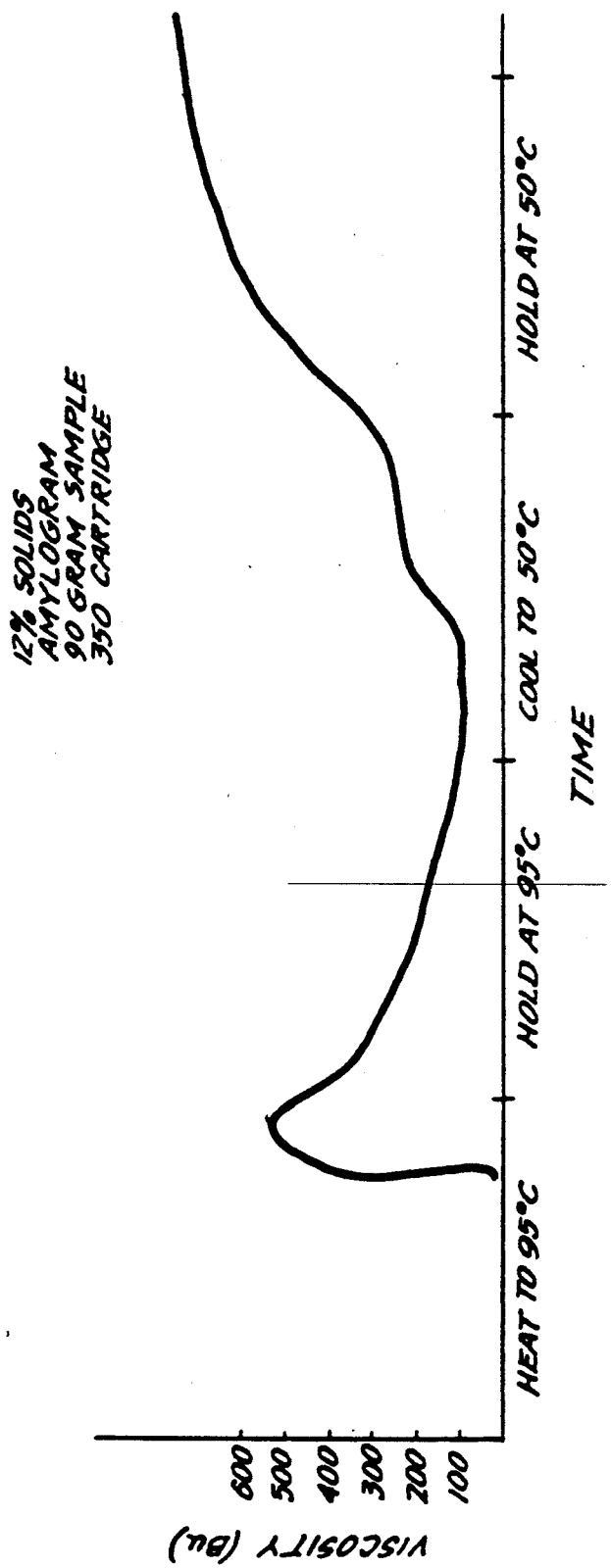

BATTER STARCH FOR DEEP FAT FRIED FOOD

This is a continuation of application Ser. No. 392,840, filed Aug. 11, 1989, now abandoned.

This invention relates to a new batter starch for deep fat fried food and more particularly for fried foods that are frozen and subsequently reheated in a microwave oven. The batter starch of the present invention is an esterified huh starch with a protein content greater than or equal to about 1.0% by weight dry starch.

Conventionally, deep fat fried foods are prepared by coating a foodstuff with a batter mix and then breading the batter coated foodstuff with a breading mix. Sometimes the foodstuff is dusted with a dry mix prior to dipping.

Typically, batter mixes contain starch and cereal flour. Mildly oxidized starches, thin boiled starches, cross-linked starches and acetylated starches have also been tried in batter mixes. U.S. Pat. No. 3,655,443 issued Apr. 11, 1972 teaches using an oxidized starch having a protein content greater than 0.7 percent by weight. This oxidized starch was found to lead to better adhesion of the breaded batter coating to the foodstuff.

It has now been discovered that an esterified dub starch having a low degree of substitution and a protein content greater than or equal to about 1.0% by weight dry starch provides good adhesion of a breaded batter coating to foodstuff and produces a crunchy and crispy breaded batter coating. The batter starch of the present invention has been found to produce a crunchy and crispy breaded batter coating to deep fat fried food that was subsequently reheated in a microwave oven. The preferred batter starch of the present invention is esterified with acetic anhydride to a degree of substitution (DS) between about 0.02 to about 0.1.

The batter starch of the present invention is useful as an ingredient in a batter mix for foodstuffs that are subjected to deep fat frying and then served immediately after frying; or foodstuffs that are prefried, frozen and then reheated after freezing such as by refrying, heating in a conventional oven or heating in a microwave oven.

The present invention may be used to advantage whenever it is desired to coat a foodstuff with a breading mix. The term "breading mix" will be understood by those skilled in the art to mean any mix which is applied to foodstuffs before deep fat frying. Such mixes include bread crumbs, cookie crumbs, cracker crumbs and the like, either alone or mixed with butter, salt, seasoning, etc. The term "foodstuff" means any food which can be deep fried, such as meats, fish, shellfish, fowl, vegetables, etc.

Broadly, a batter mix made in accordance with the present invention comprises water; and an effective amount of an esterified starch, said starch obtained from a starch bearing plant having a dull horny (duh) homozygous genotype, said esterified starch having a degree of substitution between about 0.02 to about 0.10, and a protein content of greater than or equal to about 1.0% by weight dry starch. Preferably, enough batter starch of the present invention is cbmbined with water to produce a batter mix with a solids content between about 25 to about 50% by weight. Good results have been obtained with a batter mix having a solids content of about 40% by weight.

Any plant that produces edible starch and can be crossbred to produce a plant that is a duh homozygous genotype may be used to provide the duh starch. Plants that produce edible duh starch are obtained not only by standard plant crossbreeding techniques but also by moving the duduhh genotype to another portion of the plant genome by translocation, inversion or other methods of chromosome engineering. The preferred plant source is maize.

Generally, to obtain a starch bearing plant with both double recessive mutants of the du and h genotype, a plant having the du mutant is crossed with a plant having a h mutant and thereafter inbred to obtain a plant homozygous in duh. After the homozygous duh genotype is obtained, standard breeding techniques are used to obtain hybrid vigor. Hybrids are preferred because of their starch yield compared to inbred lines. The method of crossbreeding plants, obtaining specific-genotype in the offspring, and breeding to obtain hybrid vigor is well-known.

Extraction of the starch from the plant is done in a conventional manner. With the preferred plant source, maize, extraction of the duh starch from the kernels is done preferably in a conventional corn wet milling operation. Corn wet milling entails the successive steps of steeping the kernels, grinding the kernels and then separating the starch from the other components of the kernel, i.e. germ, hull, gluten and corn oil.

U.S. Pat. No. 4,774,328 issued Sep. 27, 1988 teaches using duh starch as a thickener for foods. Typical physical characteristics of duh starch extracted from maize are as follows:

|  | duh |
| --- | --- |
| Apparent Amylose | 34.9% |
| Gelatinization Temp. | 69.1° C. |
| Brabender Amylogram | |
| Initial Rise | 89° C. |
| Heating Peak | 35 BU |
| Heating Final | 35 BU |
| Cooling Peak | 120 BU |
| Cooling Final | 115 BU |

The percent amylose was determined using standard colorimetric iodine procedures wherein the starch is first gelatinized with sodium hydroxide and then reacted with an iodine solution and the resulting sample measured using a spectrophotometer in a 1 cm cell at 600 nm against a blank of 0.2% iodine solution.

The gelatinization temperature was measured using a scanning calorimeter, Mettler Model No. 300, using a 30% solids starch following the procedure outlined in the owner's manual for that model.

The Figure illustrates a Brabender amylogram of the duh starch run at 12% solids in an acid environment using a 90 g sample with 350 gram cartridge at 100 rpm. The exact procedure used is outlined in the Amylograph Handbook of the American Association of Cereal Chemists, 1982 edition at pages 17 and 18. The respective paddle for the 90 gram cup was used.

The initial rise was the temperature at which the pen moves away from the baseline.

The sample started at room temperature and the rapid heat mode of the instrument was used to heat the sample to 50° C. Once 50° C. was reached, the instrument was set at a controlled rate of heating, 1.5° C./minute, until a temperature of 95° C. was reached. The sample was then held at 95° C. for 30 minutes. During this period of heating, the highest viscosity obtained by the sample was labeled Heating Peak. The Heating Final was the last viscosity obtained by the sample at the end of the heating cycle. Next, the sample was cooled at 1.5° C./minute to a temperature of 50° C. The sample was then held at 50° C. for 30 minutes. The largest viscosity measurement taken during this cooling cycle was the Cooling Peak and the final viscosity at the end of the cooling cycle was the Cooling Final.

Brabender curves are a well-known tool for determining characteristics of starch.

The protein used to adjust the protein content of the duh starch can be of either animal or vegetable origin. As a general rule, however, it is preferred to use a protein derived from the same material as the starch, e.g. add corn protein (corn gluten) to corn starch. Normal commercial starches have a protein level of approximately 0.2 to 0.6% and it is necessary to adjust this level to greater than about 1.0% protein by weight dry starch. This adjustment in the protein level of the starch can be made by any suitable method. One suitable method is the simple addition of protein. A second suitable method to adjust the protein content is to combine a starch with a high protein content with one which has a low protein content such that the resulting mixture has the desired protein level. A third method especially applicable to corn starch is simply to reduce the amount of gluten that is normally removed during the extraction process of starch from corn kernels.

The protein content of starch is increased to greater than or equal to about 1.0% by weight dry starch. Preferably the protein level in the starch is increased to between about 1.0 to about 11% by weight based on dry starch. Good results have been obtained by adjusting the protein content to about 1 to about 2% by weight dry starch.

Preferably, gluten is added to adjust the protein content to greater than or equal to about 1.0% by weight dry starch. More preferably, about 1.0 to about 5% by weight dry starch of gluten is added. Good results have been obtained by adding about 1% by weight dry starch of corn gluten to adjust the protein content of the starch. The protein content of the starch is suitably measured by the Standard Analytical Method B-48 Corn Refiners Association Standard Nov. 26, 1956, Revised June 25, 19.80.

The esterified duh starch of the present invention has a DS of about 0.02 to about 0.10 and more preferably about 0.06 to about 0.10. Good results have been obtained with duh starch having a DS between about 0.07 to about 0.08. Degree of substitution is determined in a conventional manner using The Standard Analytical Method C-2 Corn Refiners Association Tentative Standard May 27, 1968.

In order to esterify the duh starch granules, a slurry of starch is prepared having about 5 to about 40% by weight starch. The pH of the slurry is then adjusted to about 8 to about 10 and an esterification agent is added to the slurry such as vinyl ester, acetyl halides, or acid anhydrides such as acetic anhydride or succinic anhydride. The esterification agent is added quickly while maintaining the pH of the slurry. The reaction is continued for about .01 to about 5 hours at about 80° F. (27° C.) to about 120° F. (50° C.). Once the reaction is completed to the desired degree of substitution, the slurry is neutralized, dewatered, washed and dried.

Preferably, the duh starch granules are reacted with the esterification agent to produce an esterified starch having the structural formula:

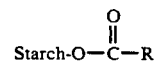

wherein R is selected from the group consisting of alkyl, alkylene, hydroxyalkyl, hydroxyalkylene, or alkanoic acid, and contains one to six carbons. Good results have been obtained when R is a methyl group, i.e. acetylated starch.

Acetylation of the duh starch granule is conducted in an aqueous medium in a conventional manner to obtain the appropriate DS. Appropriate acetylating agents include vinyl acetate and acetic anhydride. Suitable catalysts are sodium hydroxide, calcium hydroxide and sodium carbonate.

Preferably, acetylation of the duh starch is conducted by preparing a slurry of duh starch granules in water at a solids content of between about 30 to about 35% by weight dry starch. The pH of the slurry is adjusted to between about 8 to about 11 by the addition of calcium hydroxide. The amount of calcium hydroxide, corresponding to a molar ratio of calcium hydroxide to esterification agent of about 0.8 to 1, is added to the slurry and mixed thoroughly with the starch granules for about 30 minutes. The esterification agent, acetic anhydride, is added as quickly as possible to the well-stirred slurry, whereupon the pH falls to the desired range of about 5.0 to about 5.5. Acetic anhydride is added to the slurry in an amount to obtain the desired DS. If necessary, acid is added after 1 to 3 minutes of reaction to reduce pH to the desired range. Once the reaction is complete the slurry is neutralized and dewatered. The acetylated starch is then washed and dried. The protein content of the starch can be adjusted prior to acetylating or after acetylating the starch.

The batter mix of the present invention is prepared by combining water and the batter starch of the present invention. Good results have been obtained by mixing the water into the batter starch but any conventional process can be employed.

Preferably, the foodstuff is dusted with the starch of the present invention prior to coating the foodstuff with the batter mix of the present invention.

These and other aspects of the present invention may be more fully understood by the following examples:

EXAMPLE 1

This example illustrates making an acetylated duh starch having an adjusted protein content of about 1% by weight dry starch.

A slurry was formed from 3.0 kg of duh starch granules, protein content 0.6%, and 7 liters of water. To this slurry was added 30 grams of gluten. The gluten was a mixture of gluten extracted from common corn and waxy corn kernels. Next, 150 grams of reagent grade calcium hydroxide (Ca(OH)$_2$) was added to the slurry to adjust the pH of the slurry to about 12. The slurry was mixed for 30 minutes to get good dispersion of the calcium hydroxide. Next, 260 grams of industrial grade acetic anhydride was added quickly to the slurry, while mixing continued. About one minute after the addition of all the anhydride, the pH of the slurry was adjusted to approximately 5 to terminate the reaction. The slurry was then subjected to the subsequent wash steps of dewatering, reslurrying and dewatering. Finally, the product was dried in a fluidized bed dryer.

The resulting starch had a DS of 0.076 and a protein content of 1.26% by weight dry starch.

EXAMPLE 2

This example illustrates another way of making the starch of the present invention.

Following a procedure similar to the one outlined in Example 1 above, an acetylated duh starch was made. However, this time no gluten was added to the slurry. The resulting acetylated starch had a DS of 0.09 and a protein content of 0.6% by weight dry starch. To this acetylated starch 1% by weight gluten was added to raise the protein content of the starch to about 1%.

EXAMPLE 3

This example illustrates the good, adhesion of the batter starch of the present invention.

TABLE

| | SAMPLE | | | |
|---|---|---|---|---|
| | A | B | C | D |
| Starch | duh | duh | high amylose corn starch | high amylose corn starch |
| DS (acetyl) | 0.09 | 0.09 | 0.094 | 0.094 |
| % Protein Initial | 0.6 | 0.6 | 0.8 | 0.8 |
| % Gluten added | 1.0 | 0 | 1.0 | 0 |
| % Protein Final | 1.26 | 0.6 | 1.13 | 0.8 |
| Results of Fry | | | | |
| sides | very crisp + crunchy | crisp + crunchy | crunchy + crisp | crisp |
| center | very crisp + crunchy | crisp + crunchy | soft | soft |
| bottom | very crisp + crunchy | crisp + crunchy | soft | soft |
| Adhesion of Batter | very good | good | fair | fair |

Four samples A-D of fillets of fish weighing approximately 4 oz. (120 g) were prepared.

Sample A was dusted and battered with the acetylated duh starch of the present invention. Both the dusting medium and the batter mix contained the starch of Example 2 above. The protein content was adjusted by the addition of gluten.

Sample B was dusted and battered with a batter mix, both the dusting medium and batter mix containing acetylated duh starch without having its protein content adjusted.

Sample C was dusted and dipped into a batter mix, both the dusting medium and batter mix made from a high amylose corn starch sold under the name AMAIZO 5®by American Maize-Products Co. of Hammond, IN. The amylose content was about 50%. The protein content was adjusted by addition of gluten.

Sample D was dusted and dipped into a batter mix, both the dusting medium and batter mix made from the acetylated starch used in Sample C, except its protein content was not adjusted.

Each starch was acetylated in a manner as outlined in Example 1 above. The gluten added was corn gluten having a protein content of about 60%.

All samples were prepared by first dusting the foodstuff in the starch, and then thoroughly dipping the dusted foodstuff into a batter mix of 40% solids made of water and the starch. The battered fillets were then drained and breaded with a breading mix.

Each portion was then deep fat fried in vegetable oil at 191° C. for 3.5 minutes. The fillets were then cooled to about 60° C.

After cooling, adhesion was tested. Finally a taste panel of five tasters tested the fillets to determine how crispy and crunchy they were. It is clear from the above results that the material of the present invention was superior to the others.

It will be understood that the claims are intended to cover all changes and modifications of the preferred embodiment of the invention herein chosen for the purpose of illustration which do not constitute a departure from the spirit and scope of the invention.

What is claimed is:

1. An esterified starch suitable for use in a batter mix for deep fat fried foods characterized in that the starch is obtained from a starch bearing plant having a duh homozygous genotype, said starch having been esterified to a degree of substitution of between about 0.02 to about 0.1 and having a protein content greater than or equal to about 1.0% by weight dry starch.

2. The starch of claim 1 wherein the starch bearing plant is maize and the protein content is between about 1.0 to about 11%.

3. The starch of claim 1 wherein the starch has been esterified with acetic anhydride.

4. The starch of claim 1 wherein corn gluten has been added to the starch to provide a protein content of about 1 to about 2% by weight dry starch.

5. A batter mix for breaded deep fat fried foods comprising water and an effective amount of an esterified starch characterized in that the starch is obtained from a starch bearing plant having a duh homozygous genotype, said starch having been esterified to a degree of substitution of between about 0.02 to about 0.1, and having a protein content greater than or equal to about 1.0% by weight dry starch.

6. The batter mix of claim 5 wherein the batter mix has a solids level of about 25% to about 50%.

7. A method for producing a batter mix starch for deep fat fried foods comprising the steps of:
   a) adjusting the protein content of a starch obtained from a starch bearing plant having a duh homozygous genotype to greater than or equal to about 1.0% by weight dry starch and
   b) esterifying the starch with an esterification agent to a degree of substitution of about 0.02 to about 0.10.

8. The method of claim 7 wherein the starch bearing plant is maize.

9. The method of claim 7 wherein the protein content is adjusted to between about 1.0 to about percent by weight dry starch.

10. The method of claim 7 wherein the protein content is adjusted by the addition of corn gluten.

11. The method of claim 7 wherein the esterification agent is acetic anhydride.

12. The batter mix of claim 5 wherein the starch bearing plant is maize.

13. The batter mix of claim 5 wherein the protein content is between about 1.0 and about 11%.

14. The batter mix of claim 5 wherein the starch has been esterified with acetic anhydride.

15. The batter mix of claim 5 wherein corn gluten is added to the starch to provide a protein content of about 1 to about 2% by weight dry starch.

16. The batter mix of claim 12 wherein the protein content is between about 1 and about 2%.

17. The batter mix of claim 12 wherein corn gluten is added in an amount of about 1 to 5% by weight dry starch to provide a protein content greater than or equal to 1.0%.

18. The batter mix of claim 12 wherein the starch is esterified with acetic anhydride to a degree of substitution of about 0.06 to about 0.10; and the protein content is between about 1.0 and about 11%.

19. The batter mix of claim 12 wherein the starch is esterified with acetic anhydride and croen gluten is added to provide a protein content between about 1 and about 11%.

20. The batter mix of claim 18 wherein the batter mix has a solids level of about 25% to about 50%.

* * * * *

UNITED STATES PATENT AND TRADEMARK OFFICE
CERTIFICATE OF CORRECTION

PATENT NO. : 5,164,215

DATED : November 17, 1992

INVENTOR(S) : Susan L. Furcsik et al.

It is certified that error appears in the above-identified patent and that said Letters Patent is hereby corrected as shown below:

On the title page and in column 1, in the title, before "BATTER" insert —DUH—.

Column 1, line 10, change "huh" to --duh--; line 25, change "dub" to --duh--; line 62, change "cbmbined" to --combined--.

Column 2, line 16, delete the hyphen between "specific" and "genotype".

Column 3, line 45, change "19.80" to --1980--.

Column 5, line 16, delete the comma after "good"; line 58, after "The", insert --AMAIZO 5 was acetylated and the--.

Column 6, line 54, before "percent", insert --11--.

Column 7, line 4, before "5%", insert --about--.

Column 8, line 4, change "croen" to --corn--.

Signed and Sealed this

Twelfth Day of October, 1993

Attest:

BRUCE LEHMAN

Attesting Officer — Commissioner of Patents and Trademarks